July 31, 1951 — E. E. WEMP — 2,562,515
CENTRIFUGALLY ENGAGED FLUID CLUTCH
Filed Dec. 22, 1945 — 3 Sheets-Sheet 2
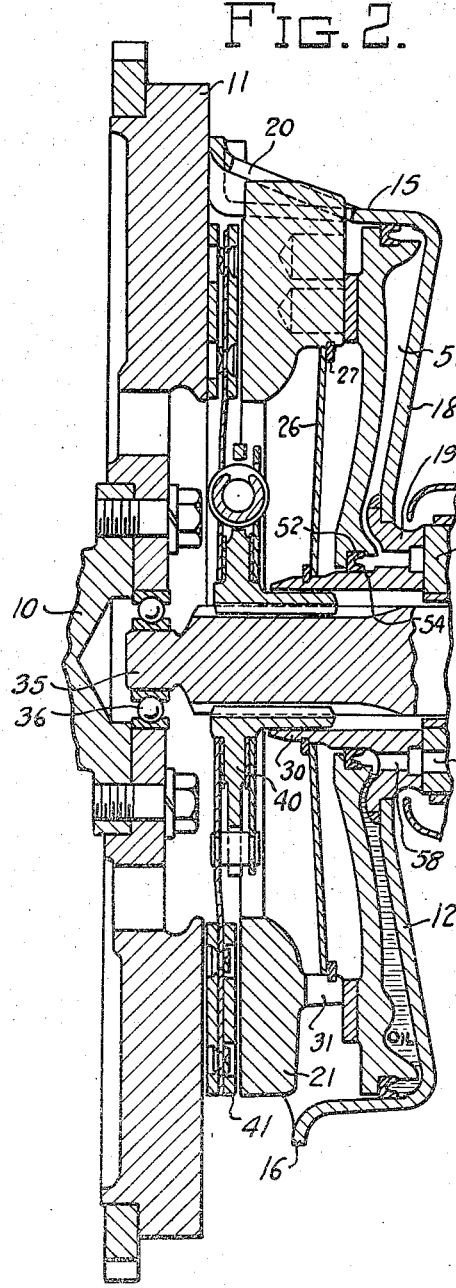
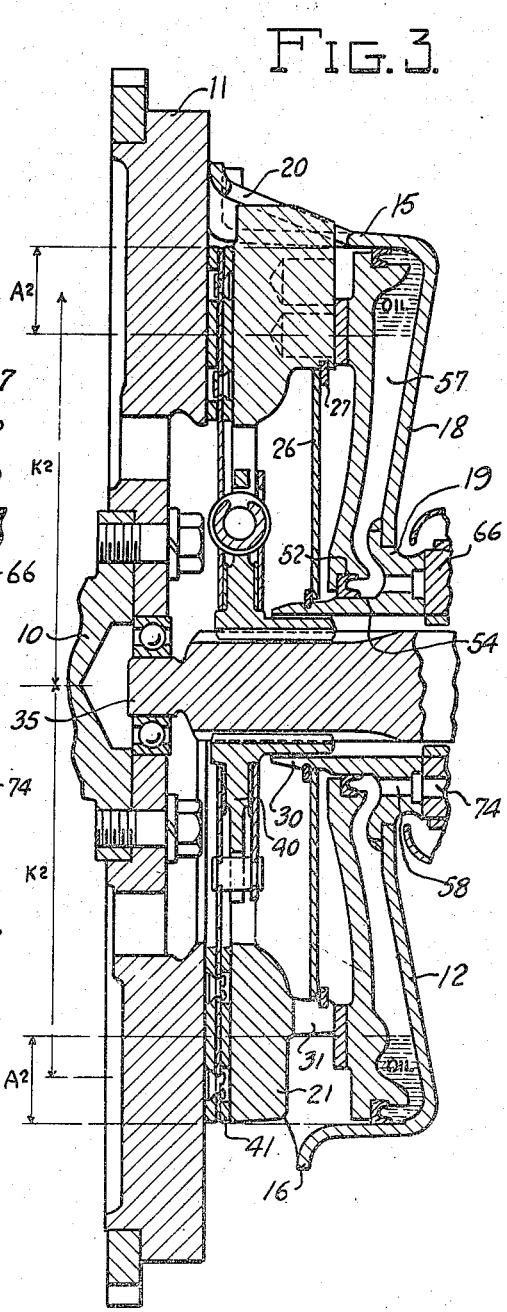
INVENTOR.
ERNEST E. WEMP
BY
Barnes, Kisselle, Laughlin & Raisch
ATTORNEYS July 31, 1951  E. E. WEMP  2,562,515
CENTRIFUGALLY ENGAGED FLUID CLUTCH
Filed Dec. 22, 1945  3 Sheets-Sheet 3

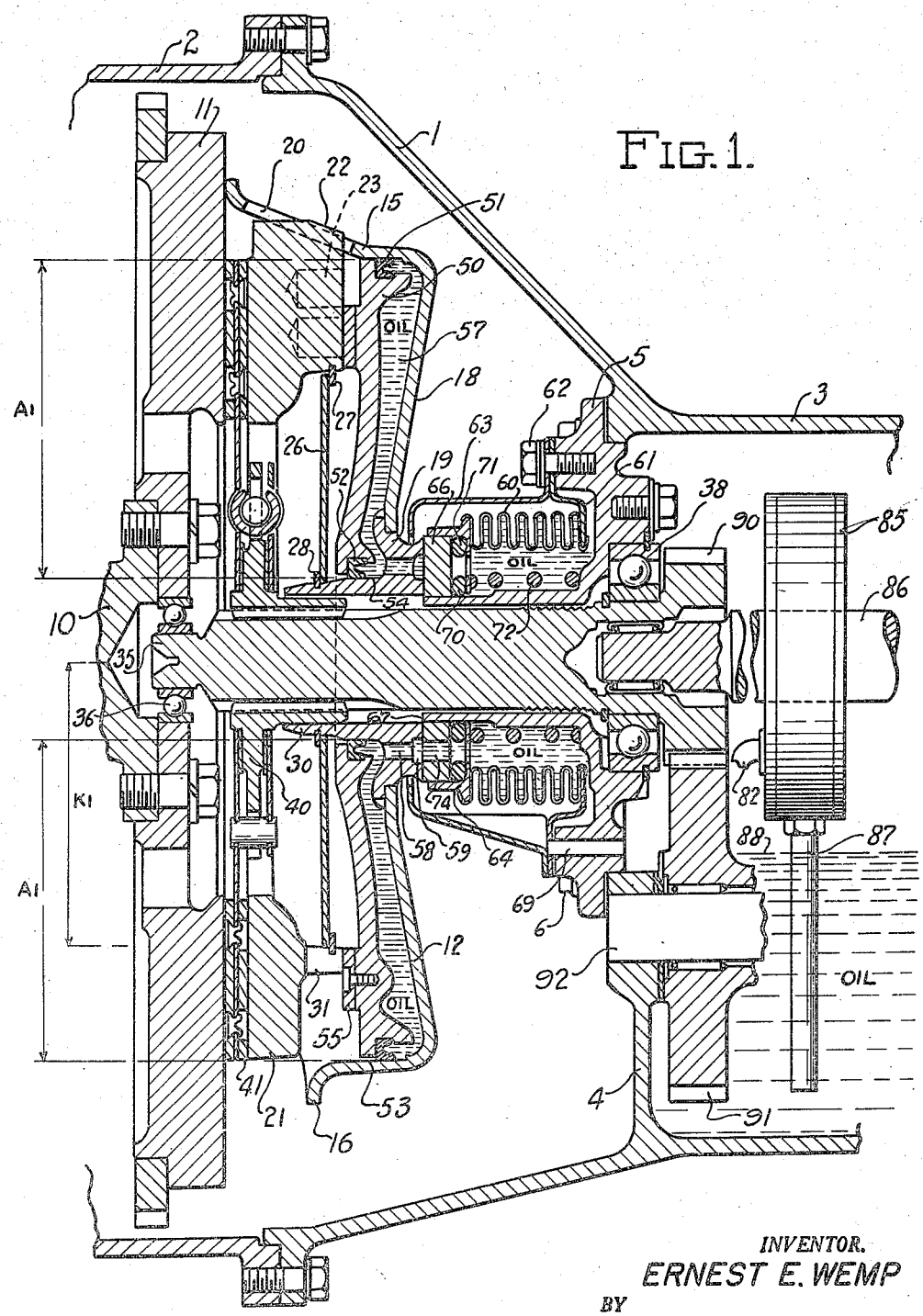

INVENTOR.
ERNEST E. WEMP
BY
Barnes, Kisselle, Laughlin & Raisch
ATTORNEYS

Patented July 31, 1951

2,562,515

UNITED STATES PATENT OFFICE 2,562,515

CENTRIFUGALLY ENGAGED FLUID CLUTCH

Ernest E. Wemp, Detroit, Mich.

Application December 22, 1945, Serial No. 636,650

7 Claims. (Cl. 192—105)

This invention relates to a clutch of an automatic type and it has to do particularly with a clutch which may be most useful with internal combustion engines. The clutch, moreover, is adapted for use in automotive vehicles and while the clutch of the present invention is not limited to such usage it is convenient, in order to give a clear description of the function and operation of the clutch, to visualize it as used in an automotive vehicle.

The clutch of the present invention is designed for use with a power transmitting arrangement where different ratios between the engine and the driven means may be varied without requiring clutch disengagement. In other words, in an automotive vehicle, the clutch may be used either with an automatic transmission or a transmission which embodies other means, such as a power coupler, for changing the gear ratio without requiring clutch disengagement.

As mentioned above, the clutch is one of an automatic nature and is designed to become engaged incident to increase in the speed of rotation. For example, when the engine is idling at the usual idling speed, the clutch is disengaged but upon acceleration of the engine the clutch becomes automatically engaged to thereby couple the engine and the traction wheels to the vehicle and propel the same. Conditions arise in an arrangement of this type which present a serious obstacle to the provision of such an automatic clutch, and one of these conditions is the fact that the engine will not always idle at the same speed of rotation. For example, an engine may be so designed that its normal idling speed is in the vicinity of 500 R. P. M. or 600 R. P. M., but this normal idling speed is one where the engine is adequately warmed up to an operating condition. However, when the engine is cold it requires an increased speed of operation in order to maintain operation. Accordingly, a vehicle most usually is equipped either with a hand choke or some automatic control to maintain a high idle speed condition until the engine becomes warmed up, so to speak, at which time the adjustment, either by hand or automatically, is made to set the controls for the normal engine idling speed.

An automatic clutch which is arranged to engage incident to increased speed of rotation should, in order to obtain the most desirable conditions, begin its engagement at a speed not too far above the normal idling speed. Accordingly, such a clutch will become partially engaged when the engine is operating at the high idle condition and, of course, this is very undesirable. The present invention aims to provide a clutch which will automatically meet these two conditions. In other words, the clutch automatically accommodates itself to take care of the high idle requirements and accommodates itself to the normal running condition for clutch engagement at speeds which may be below the speed of the high idle. To this end, a clutch is provided which may be considered as a combined centrifugal and hydraulic clutch and in this connection the liquid employed in the hydraulic system becomes the centrifugal mass for engaging the clutch upon increase of R. P. M.

The invention will be fully understood and other objects appreciated as the detailed description is considered. The drawings show one construction for carrying out the invention and in these drawings:

Fig. 1 is a cross sectional view taken through a clutch constructed in accordance with the invention and showing the same fully engaged in a normal operating condition.

Fig. 2 is a view similar to Fig. 1 but illustrating the clutch in an at rest condition with the clutch disengaged.

Fig. 3 is a cross sectional view similar to Fig. 2 showing the clutch engaged by reason of an increase in the speed of rotation, but before the pump is supplying additional oil.

The clutch housing is illustrated at 1, suitably attached to a portion of an internal combustion engine as shown at 2, while the housing of a suitable transmission is shown at 3. The clutch housing and the transmission housing are separated by a partition 4 which is shown as comprising a separate closure piece 5 suitably attached to the partition 4 by cap screws 6 and which piece 5 is designed for the passage of a shaft therethrough and for the reception of a bearing and for other purposes which will presently appear.

Figure 4:
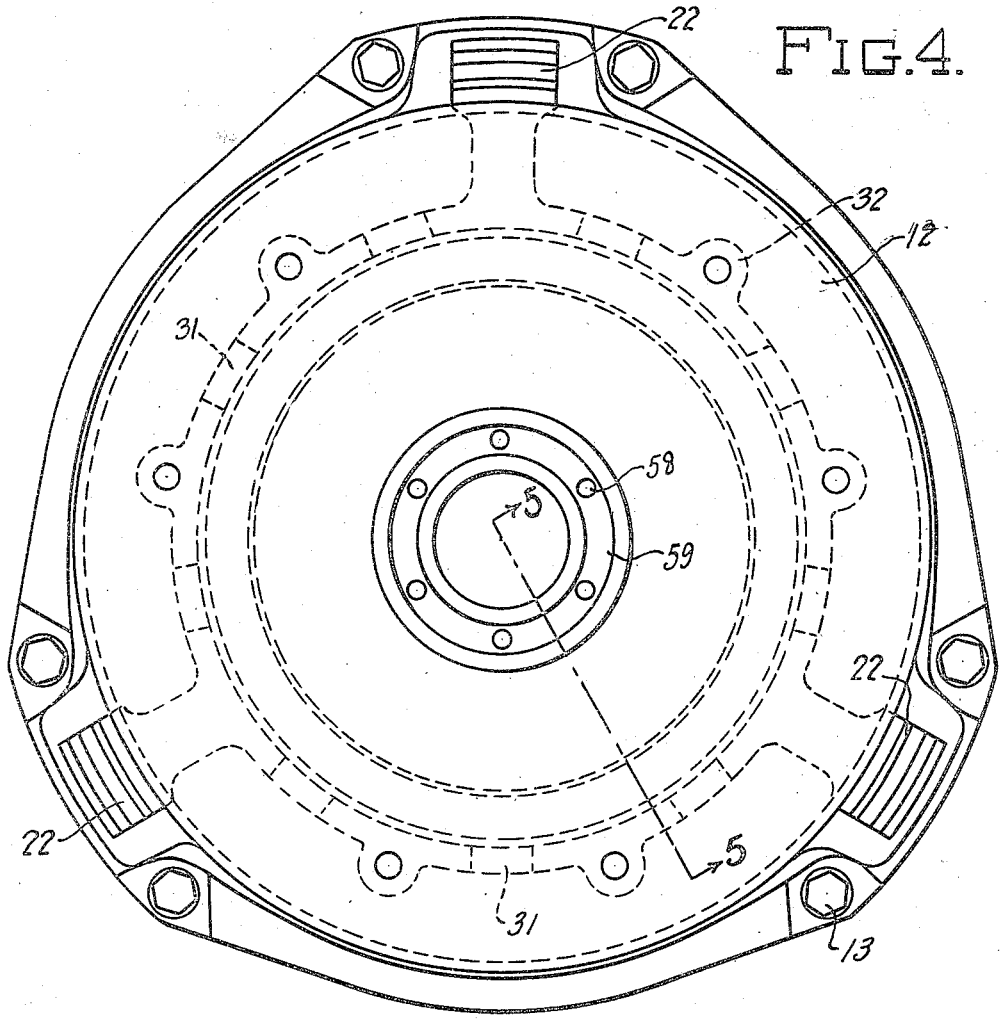
Fig. 4 is a rear elevational view of the clutch showing the cover plate or housing.

The crank shaft of the engine is shown at 10 attached to which is a fly wheel 11 and secured to the fly wheel is what may be termed a cover plate or shell 12. This cover plate, as shown in Fig. 4, may be attached to the fly wheel by suitable cap screws 13, which may be arranged in spaced pairs as indicated. The cover plate has a flange portion 15 which extends in an axial direction and between the locations of attachment by the cap screws the forward edge of the cover plate is backed away from the fly wheel as indicated at 16 for the passage of air to thus ventilate and cool the clutch.

The rear wall of the cover plate is illustrated at 18 and this wall is preferably and advantageously dished or depressed forming a diverging wall structure, as shown in Fig. 1. The rear wall 18 is provided with a central opening and in the opening is secured a hub member 19. This hub member is fixedly located as by means of being welded to the rear wall of the cover plate and the diverging form, in conjunction with the hub, forms a particularly strong and stiff rear wall construction.

The flange 15 of the cover plate is cut out to provide a suitable number of apertures 20 and disposed within the cover plate is a pressure plate of the clutch as illustrated at 21. This pressure plate has lugs 22 which fit into the apertures 20 so that the fly wheel, cover plate and pressure plate all rotate in unison and the pressure plate is a driving member of the clutch. The pressure plate is of thickened construction preferably adjacent the lugs to provide a mass of metal which may be drilled out as indicated at 23 for balancing purposes.

The pressure plate, which is in fact, of ring construction, is mounted upon and is partially controlled by a plate-type spring of dished washer-like construction as shown at 26. This is a washer of spring metal and such a spring is generally known as a Belleville spring or Belleville washer. The outer peripheral edge of the washer is associated with the pressure plate as by means of a snap ring 27 located in an internal groove in the pressure plate while the inner peripheral edge of the spring washer is disposed upon the hub 19 and is held in position thereon as by means of a snap ring 28 disposed in an external groove in the hub. For this purpose, the hub 19 has a hollow extension 30. The hub extension 30 lies over the driven disc hub with a suitable running clearance. This is particularly advantageous in locating the driven disc in making an assembly. With the cover plate assembly in position, the driven disc is held generally centered by the hub extension so that when the driven shaft 35 is pushed into position its leading end can be passed into the driven disc hub. The slight off-center position of the driven disc can be corrected by manipulation of the driven shaft 35.

The outer periphery of the spring washer is associated with the pressure plate by means of a plurality of extensions or lugs 31 which extend over the outer peripheral edge of the washer and which receive the snap ring 27. A number of these are shown in Fig. 4 and the snap ring bridges the space between the lugs. This provides for the passage of air for cooling purposes. The pressure plate also has other extensions or lugs 32 disposed in spaced relationship and located between the lugs 31 and these may be drilled to remove metal therefrom for balancing purposes.

A driven shaft is illustrated at 35 and its forward end is piloted in the fly wheel, as indicated at 36, and it is journaled in a bearing 38 carried by the partition member 5. A driven clutch member has a hub 40 splined or otherwise mounted on the driven shaft and the clutch member has facings 41 positioned to lie between the face of the fly wheel and the face of the pressure plate. As is well known to those versed in the art, clutch engagement takes place when the driven member is packed with pressure between the fly wheel and the pressure plate and the clutch may be disengaged when the pressure plate is retracted to disengage the facings of the driving member. The spring 26 is arranged so that it normally acts upon the pressure plate to retract it from the fly wheel to the position shown in Fig. 2 for clutch disengagement.

Positioned between the pressure plate and the back wall of the cover plate is a piston 50. This piston is fashioned to provide an outer peripheral form for the reception of a sealing element 51 and it is fashioned to provide an inner peripheral form for the reception of a sealing element 52. These sealing elements are preferably of a synthetic rubber which will withstand the action of oil. The outer sealing element 51 functions on an internal surface 53 in the cover plate which, in effect, constitutes a cylinder and the surface 53 is preferably accurately machined. The extension 30 of the hub has a surface 54 upon which the inner sealing ring 52 functions. Accordingly, it will be appreciated that the piston is capable of a reciprocable motion in the cylinder formation with the sealing elements functioning slidably on the said surfaces. The piston and pressure plate are associated with each other so that the piston may act upon the pressure plate and this is preferably accomplished through the means of suitable heat insulating material 55 which may be in the form of a ring attached to the piston and which has a contacting engagement with the pressure plate.

The space between the back of the cover plate and the piston, as shown at 57, is designed to receive the liquid of a hydraulic system, such liquid preferably being a suitable oil, and the hub 19 is provided with a number of passageways 58 extending therethrough and which communicate with a relatively enlarged groove or channel 59 on the outer face of the hub. For the purpose of conducting the liquid and introducing the same to the piston, an expansible chamber structure is preferably employed, such as one of the bellows type having a corrugated flexible wall 60. One end of the corrugated wall is connected to a plate 61 which is attached to the partition element 5 as by means of cap screws 62, and to cover and protect the bellows is an overhanging guard 63 which also is held by the cap screws. The opposite end of the flexible wall is connected to a terminal ring 64 which surrounds an element of suitable material for frictionally engaging the outer face of the hub 19. This element is shown at 66 and it has a sliding engagement with the surface of an extending hub formation 67 on the cap 5. A sealing member, preferably of a synthetic rubber or the like, is employed to seal the joint between the element 66 and the extension 67 as illustrated at 70, and another similar member 71 seals the joint between the terminal ring 64 and the element 66. A coil spring 72 reacts against the closure piece 5 and against the end element 66 to keep the element 66 in tight engagement against the face of the hub 19. The element 66 is provided with a plurality of apertures 74 which communicate with the channel 59 and, therefore, with the ports 58 and with the space within the expansible wall 60.

Figure 5:
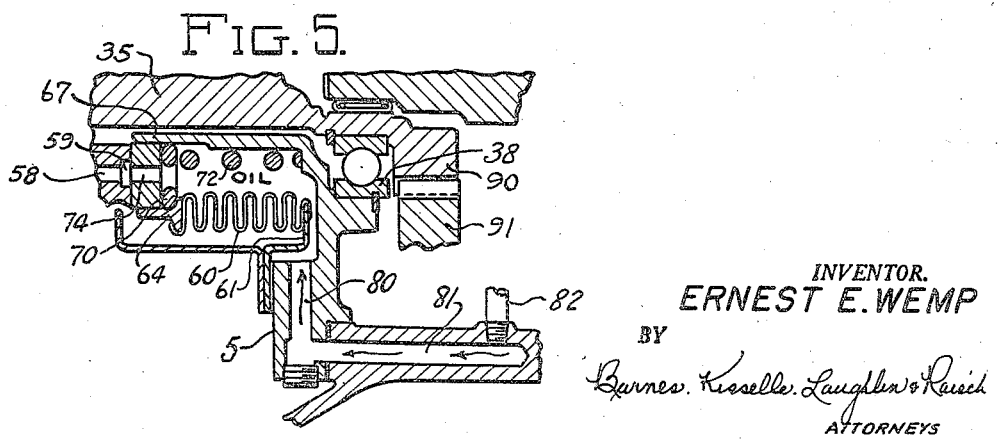
Fig. 5 is a detailed sectional view illustrating passageways for the hydraulic medium and taken substantially on line 5—5 of Fig. 4.

The fixed end of the expansible wall structure is open so that the end piece 61 forms a part of the chamber and suitable passageways connect into the chamber as illustrated in Fig. 5. Here it is shown that a passage 80 is formed in the wall of the closure piece 5 and that this communicates with a passage 81 in turn connected to a conduit 82 which leads to a suitable source of liquid pressure supply. This supply, as shown in Fig. 1, is in the form of a pump 85 arranged to be driven by a power transmitting shaft 86. The pump has an inlet tube 87 which extends into the oil or other medium in the case 3 which may be at about the level as indicated at 88. The outlet of the pump is shown at 82 in Fig. 1 and this connects to the passage 81 as shown in Fig. 5. The driven shaft 35 extends into the housing 3 and some of the gears of the transmission are shown, such as the gear 90 on the end of the driven shaft 35, gear 91 mounted on a counter-shaft 92, and other gear means (not shown) are employed to drive the shaft 86 from the gear 91. The shaft 86 is connected to the vehicle traction wheels and operates during vehicle movement. Suffice it to say, that the pump 85 is driven by the driven member of the clutch and the driven shaft 35, and, therefore, the pump operates only when the clutch is engaged. Liquid which may leak through the seal at 66 may be caught by the shield 63 and drains back into the sump through port 69.

In considering the operation of the clutch, a normal operating situation will first be visualized and in this connection reference may be made to Fig. 1. In considering this figure, it may be assumed that the engine is operating, the clutch is engaged and the shaft 86 is operating. The pump supplies liquid under pressure through the conduit 82 and into the interior of the expandable chamber. This liquid or oil flows through the ports 74 and ports 58 and fills the chamber 57 thus pushing the piston to the left as Fig. 1 is viewed. This action flexes the spring 26 and pushes the pressure plate up against the driven disc so that the driven disc is frictionally engaged between the fly wheel and the pressure plate. At this time the clutch is engaged not only by reason of the centrifugal head of the oil in the chamber 57 but also by reason of the pressure supplied by the pump.

Let it be assumed now that the mechanism is in an automotive vehicle and that the vehicle is decelerated and brought to a stop as, for example, at a traffic light. As the deceleration takes place, the pressure of the liquid supplied by the pump decreases and the centrifugal head of liquid in the chamber 57 decreases and at about the normal engine idling speed the combined pressures are insufficient to hold the clutch engaged against the action of the spring 26. As a result the spring functions to retract the pressure plate forcing some of the oil with the chamber 57 and the clutch becomes disengaged. At this time, however, while the chamber 57 is ensmalled it nevertheless is filled with oil. This is a normal idling condition. To start the vehicle the engine is accelerated and this increases the centrifugal head of the oil in the chamber 57. However, the pump is not yet operating. The centrifugal head of the oil which fills the chamber 57 increases and forces the piston to the left as Fig. 1 is viewed and starts clutch engagement. As an example, it may be considered that this action occurs at about 750 R. P. M. Upon initial clutch engagement the shaft 35 is operated resulting in an operation of the pump so that the centrifugal head is supplemented by the pumped liquid to increase the packing pressure, the additional packing pressure from the pump source being related in magnitude with the speed of the member 86.

The preferred arrangement is that the original packing of the clutch by centrifugal head is relatively light to thus promote a smoothness and nicety of clutch engaging action and that the clutch is fully engaged by centrifugal head pressure to handle maximum engine torque in and around 1800 R. P. M. to 2200 R. P. M. without operation of the pump. This could occur with the vehicle stalled in the sand or mud.

Let it be assumed now that the vehicle and the engine are at rest. There is, accordingly, no pumping action and no centrifugal action with the result that the liquid in the chamber 57 drains therefrom and gravitates down substantially to the lowermost port 58 as shown in Fig. 2. When the engine is started this liquid, which was previously held reservoired in the lower portion of the chamber 57, is thrown outwardly by centrifugal force and an annulus of oil is formed as shown in Fig. 3. This annulus of oil will not cause clutch engagement at the normal engaging speed. Under these conditions the engine may idle at a higher speed, for example, 1000 R. P. M. because of the reduced effective area of the oil on the piston and other factors. This may be calculated as follows, first with the chamber 57 filled with oil;

Let $N_1$ = normal speed of initial engagement;
Let $A_1$ = effective piston area;
Let $K_1$ = the radius of gyration of effective piston area;

The factors $A_1$ and $K_1$ are as illustrated diagrammatically on Fig. 1.

Assume a condition with the annulus of oil in the chamber 57 as shown in Fig. 3;

Let $N_2$ = speed of high idle engagement;
Let $A_2$ = effective piston area;
Let $K_2$ = radius of gyration of effective piston area;

It can be shown algebraically that $$N_2 = N_1 \frac{K_1}{K_2} \sqrt{\frac{A_1}{A_2}}$$

$$N_2 = 1.333 N_1$$

The above illustration is based on the assumption that the normal speed of initial clutch engagement is 750 R. P. M. and that high idle speed of initial engagement is about 1000 R. P. M. Obviously, these conditions may be varied as desired. While the effective radius of gyration $K_2$ is greater than the effective radius of gyration $K_1$, yet the effective piston area is substantially reduced. Thus it is seen that with warm engine idle of say 500 R. P. M. and an initial engagement at 750 R. P. M., the engagement occurs at 150% of warm engine idle, and a 50% speed margin is provided to take care of contingencies.

Now if the initial engagement with a cold engine is raised to 1000% R. P. M., a speed margin of 100% over normal warm engine idle is provided to take care of contingencies. As a result, a cold engine may be idled at a relatively high speed without causing clutch engagement.

However, upon increase of the speed of the engine above the high idling speed, the centrifugal head of the annulus of oil as shown in Fig. 3, causes clutch engagement with the resulting operation of the pump and the clutch packing pressure is supplemented hydraulically by the liquid pumped into the chamber 57.

The engine may be started by pushing or towing the vehicle since movement of the vehicle causes rotation of the shaft 86 and an operation of the pump. Liquid is thereby pumped into the chamber 57 causing clutch engagement and resultant turning over of the engine.

Thus, a clutch is provided of an automatic nature which functions from centrifugal head of a liquid and from the pumped pressure of the liquid and which automatically takes care of a situation where a higher R. P. M. idling condition of the engine is required. In addition the clutch provides for a smooth initial engagement by reason of the light packing action caused by centrifugal head but in which the torque capacity is increased to handle maximum engine torque at an adequately high engine R. P. M.

I claim:

1. In a clutch structure which has driving and driven members at least one of which is shiftable and which is arranged to be packed into engagement and to be released from packed engagement by movement of the shiftable member, the combination of means acting upon the shiftable member to normally hold the clutch disengaged, fluid pressure means for controlling the clutch including a chamber rotatable with clutch driving members, said chamber being closed in its outer zone, a piston in the chamber operable upon the shiftable member, said chamber adapted to receive liquid and arranged so that when at rest some of the liquid drains out of the chamber and some is retained therein, whereby upon the starting of rotation of the driving clutch members the retained liquid is thrown outwardly and held in the form of an annulus by centrifugal head pressure, the parts being so arranged and constructed that upon acceleration of the clutch driving members the resultant increasing centrifugal head pressure shifts the piston to cause initial clutch engagement, and pump means operable by a clutch driven member for pumping liquid into the chamber to provide additional clutch packing pressure.

2. In a clutch structure which has driving and driven members at least one of which is shiftable and which is arranged to be packed into engagement and to be released from packed engagement by movement of the shiftable member, the combination of means acting upon the shiftable member to normally hold the clutch disengaged, fluid pressure means for controlling the clutch including a chamber, closed in its outer zone and mounted for rotation with clutch driving members and extending concentrically about the axis of clutch rotation, a piston in the chamber operable upon the shiftable member, said chamber adapted to receive liquid and arranged so that when at rest some of the liquid drains out of the chamber and some is retained therein in the lower portion of the chamber, whereby upon the starting of rotation of the driving clutch members the retained liquid is thrown outwardly and held in the form of an annulus by centrifugal head pressure, the parts being so arranged and constructed that upon acceleration of the clutch driving members the resultant increasing centrifugal head pressure overcomes the means holding the clutch disengaged and shifts the piston to cause initial clutch engagement, and pump means operable by a clutch driven member for pumping liquid into the chamber to provide additional clutch packing pressure.

3. In a clutch structure which has driving and driven members at least one of which is shiftable and which is arranged to be packed into engagement and to be released from packed engagement by movement of the shiftable member, the combination of yieldable means for retracting the shiftable member to normally hold the clutch disengaged, fluid pressure means for controlling the clutch including a chamber rotatable with clutch driving members and concentric about the axis of clutch rotation, a piston in the chamber operable upon the shiftable member, said chamber adapted to receive liquid and having ports therein adjacent the axis of rotation so that when at rest some of the liquid drains from the chamber and some of the liquid is retained in the portion of the chamber below the axis of rotation, said retained liquid, upon rotation of the clutch driving members and chamber, being thrown outwardly and held in the form of an annulus by centrifugal head pressure, the parts being so arranged and constructed that upon acceleration of the driving members and chamber the resultant increasing centrifugal head pressure overcomes the yieldable means and shifts the piston to cause initial clutch engagement, and pump means operable by a clutch driven member for pumping liquid into the chamber to provide additional clutch packing pressure.

4. In a clutch structure for an internal combustion engine, which clutch structure has driving and driven members, at least one of which is shiftable, and which is arranged to be packed into engagement and to be released from packed engagement by movement of the shiftable member, the driving members being connected to rotate with the engine crank shaft, the combination of means normally retracting the shiftable member to hold the clutch disengaged, fluid pressure means for controlling the clutch including a chamber rotatable with clutch driving members, a piston in the chamber operable upon the shiftable member, said chamber adapted to receive liquid and having a port arranged so that when at rest some of the liquid drains out of the chamber and some is retained therein, whereby upon the starting of the engine and rotation of the clutch driving members and chamber the retained liquid is thrown outwardly and held in the form of an annulus by centrifugal head pressure, the head pressure on the annulus being insufficient at normal engine idling speeds to overcome the retracting means so that the clutch remains disengaged, the parts being so arranged and constructed that upon acceleration above engine idling speeds the resultant increasing centrifugal head pressure shifts the piston to cause initial clutch engagement, and pump means operable by a clutch driven member for pumping liquid into the chamber to provide additional clutch packing pressure.

5. In a clutch structure for use with an internal combustion engine, which clutch structure has driving and driven members, at least one of which is shiftable, and which is arranged to be packed into engagement and to be released from packed engagement by movement of the shiftable member, the driving members being connected to rotate with the crank shaft of the engine, the combination of means normally retracting the shiftable member to hold the clutch disengaged, means connected to a clutch driving member and providing a rotatable chamber surrounding the clutch axis of rotation, said chamber being closed in its outer zone, a piston in the chamber operable upon the shiftable member, a pump operable by a clutch driven member for pumping liquid into the chamber, the combined pressure provided by the pump and the centrifugal head pressure of the liquid in the rotating chamber serving to act upon the piston and pack the clutch members into engagement, the retracting means being arranged to retract the shiftable member for a clutch disengagement against the combined pump and centrifugal head pressure upon deceleration of the clutch driving members to a speed approximating or below engine idling speed, with the chamber remaining full of liquid, the increasing centrifugal head pressure on the liquid in the filled chamber incident to acceleration above engine idling speed serving to shift the piston and cause clutch engagement, said chamber being arranged so that when at rest some of the liquid drains out of the chamber and some of the liquid remains in the lower portion of the chamber, the retained liquid, upon the starting of the engine, being thrown outwardly and held in the form of an annulus, and the parts being so constructed and arranged that the centrifugal head pressure on said annulus of liquid serves to cause initial clutch engagement at a speed of rotation higher than that speed of rotation of initial clutch engagement when the chamber is full of liquid.

6. A clutch structure for use with an internal combustion engine comprising, a cover plate for attachment to the engine fly wheel, a pressure plate slidably engaged with the cover plate and arranged to pack a clutch driven member between the fly wheel and the pressure plate, retracting means for normally holding the pressure plate retracted from the fly wheel for clutch disengagement, said cover plate cooperating to provide a chamber extending around the axis of rotation, said chamber being closed in its outer zone, means operable by the clutch driven member for pumping liquid into the chamber to exert pressure on the shiftable member for holding the pressure plate in clutch engaged position, the chamber being arranged so that it remains substantially full of liquid at engine idling speeds and so that it is partially filled with liquid when at rest, the parts being so arranged and constructed that the centrifugal head pressure on the liquid in the chamber engages the clutch upon acceleration, with the speed of initial clutch engagement when a start is made from an at rest condition being higher than the speed of initial engagement when the engine is accelerated from an idling condition.

7. In a clutch structure which has driving and driven members, at least one of which is shiftable and which is arranged to be packed into engagement and to be released from packed engagement by movement of the shiftable member, the combination of retracting means acting upon the shiftable member to normally hold the clutch disengaged, fluid pressure means controlling the clutch including a chamber rotatable with clutch driving members and adapted to receive and hold a liquid, the chamber being closed in its outer zone and arranged so that it remains substantially full of liquid at engine idling speeds and so that it is partially filled with liquid when at rest, the parts being so constructed and arranged that centrifugal head pressure to initiate engagement with a partly filled chamber condition of rest requires a higher rotational speed than that of the full chamber condition of engine idling speed, and pump means operated by a clutch driven member for pumping liquid into the chamber for providing additional clutch packing pressure.

ERNEST E. WEMP.

REFERENCES CITED

The following references are of record in the file of this patent:

UNITED STATES PATENTS

| Number | Name | Date |
|---|---|---|
| 1,157,793 | Metten | Oct. 26, 1915 |
| 1,805,081 | Darkal | May 12, 1931 |
| 2,009,507 | Matthews | July 30, 1935 |
| 2,063,203 | Stanley | Dec. 8, 1936 |
| 2,162,873 | Wolfram | June 20, 1939 |
| 2,234,755 | Geyer | Mar. 11, 1941 |
| 2,328,091 | Nutt et al. | Aug. 31, 1943 |
| 2,328,092 | Nutt et al. | Aug. 31, 1943 |
| 2,369,417 | Spase | Feb. 13, 1945 |
| 2,422,155 | Wemp | June 10, 1947 |

FOREIGN PATENTS

| Number | Country | Date |
|---|---|---|
| 384,836 | Great Britain | Dec. 15, 1932 |